(12) United States Patent
Kaburaki

(10) Patent No.: US 10,452,556 B2
(45) Date of Patent: Oct. 22, 2019

(54) MEMORY DEVICE AND INFORMATION PROCESSING DEVICE

(71) Applicant: Toshiba Memory Corporation, Minato-ku (JP)

(72) Inventor: Satoshi Kaburaki, Meguro (JP)

(73) Assignee: TOSHIBA MEMORY CORPORATION, Minato-ku (JP)

(*) Notice: Subject to any disclaimer, the term of this patent is extended or adjusted under 35 U.S.C. 154(b) by 681 days.

(21) Appl. No.: 15/066,522

(22) Filed: Mar. 10, 2016

(65) Prior Publication Data

US 2017/0075813 A1    Mar. 16, 2017

Related U.S. Application Data

(60) Provisional application No. 62/217,393, filed on Sep. 11, 2015.

(51) Int. Cl.
| | | |
|---|---|---|
| *G06F 12/00* | (2006.01) | |
| *G06F 12/0897* | (2016.01) | |
| *G06F 12/0895* | (2016.01) | |
| *G06F 13/00* | (2006.01) | |
| *G06F 13/28* | (2006.01) | |

(52) U.S. Cl.
CPC ...... *G06F 12/0897* (2013.01); *G06F 12/0895* (2013.01); *G06F 2212/1024* (2013.01); *G06F 2212/202* (2013.01); *G06F 2212/225* (2013.01); *G06F 2212/604* (2013.01)

(58) Field of Classification Search
CPC ............ G06F 12/0815; G06F 12/0895; G06F 12/0804; G06F 12/0817
See application file for complete search history.

(56) References Cited

U.S. PATENT DOCUMENTS

| | | | | |
|---|---|---|---|---|
| 6,151,321 A | * | 11/2000 | Benson | ............... H04L 47/562 370/395.42 |
| 6,192,458 B1 | * | 2/2001 | Arimilli | ............... G06F 12/0864 711/119 |
| 7,028,156 B1 | * | 4/2006 | Kiselev | ............... G06F 11/1435 711/161 |
| 2012/0215965 A1 | | 8/2012 | Inada et al. | |
| 2013/0191609 A1 | * | 7/2013 | Kunimatsu | ............. G06F 12/10 711/203 |
| 2014/0337560 A1 | | 11/2014 | Chun et al. | |
| 2017/0068621 A1 | | 3/2017 | Watanabe et al. | |

FOREIGN PATENT DOCUMENTS

| | | |
|---|---|---|
| JP | 2012-174086 | 9/2012 |
| JP | 2014-49091 | 3/2014 |
| WO | WO 2014/038223 A1 | 3/2014 |

* cited by examiner

*Primary Examiner* — Mark A Giardino, Jr.
(74) *Attorney, Agent, or Firm* — Oblon, McClelland, Maier & Neustadt, L.L.P.

(57) ABSTRACT

According to one embodiment, a part of first information stored in a nonvolatile second memory is cached in a volatile third memory with a first cache line size in a case where a first memory included in a host is not used. A part of the first information is cached in the first memory with a second cache line size in a case where the first memory is used. The second cache line size is larger than the first cache line size.

20 Claims, 10 Drawing Sheets

MEMORY DEVICE AND INFORMATION PROCESSING DEVICE

CROSS-REFERENCE TO RELATED APPLICATIONS

This application is based upon and claims the benefit of priority from U.S. Provisional Application No. 62/217,393, filed on Sep. 11, 2015; the entire contents of which are incorporated herein by reference.

FIELD

Embodiments described herein relate generally to a memory device including a nonvolatile memory and an information processing device.

BACKGROUND

Unified Memory Architecture (UMA) is a memory architecture allowing a main memory mounted on a host to be shared by the host and a device. Also in Universal Flash Storage (UFS) that is a memory device standard, Unified Memory Extension is defined as a technology similar thereto. In a Non-Volatile Memory Express (NVMe) standard, Host Memory Buffer (HMB) is defined as a memory similar thereto.

DETAILED DESCRIPTION

According to one embodiment, a memory device is connectable to a host including a first memory. The memory device includes: a nonvolatile second memory; a volatile third memory; and a controller. in a case where the first memory is not used, the controller caches part of first information stored in the second memory into the third memory with a first cache line size. In a case where the first memory is used, the controller caches a part of the first information into the first memory with a second cache line size. The second cache line size is larger than the first cache line size.

Exemplary embodiments of memory devices and information processing devices will be explained below in detail with reference to the accompanying drawings. The present invention is not limited to the following embodiments.

First Embodiment

Figure 1:
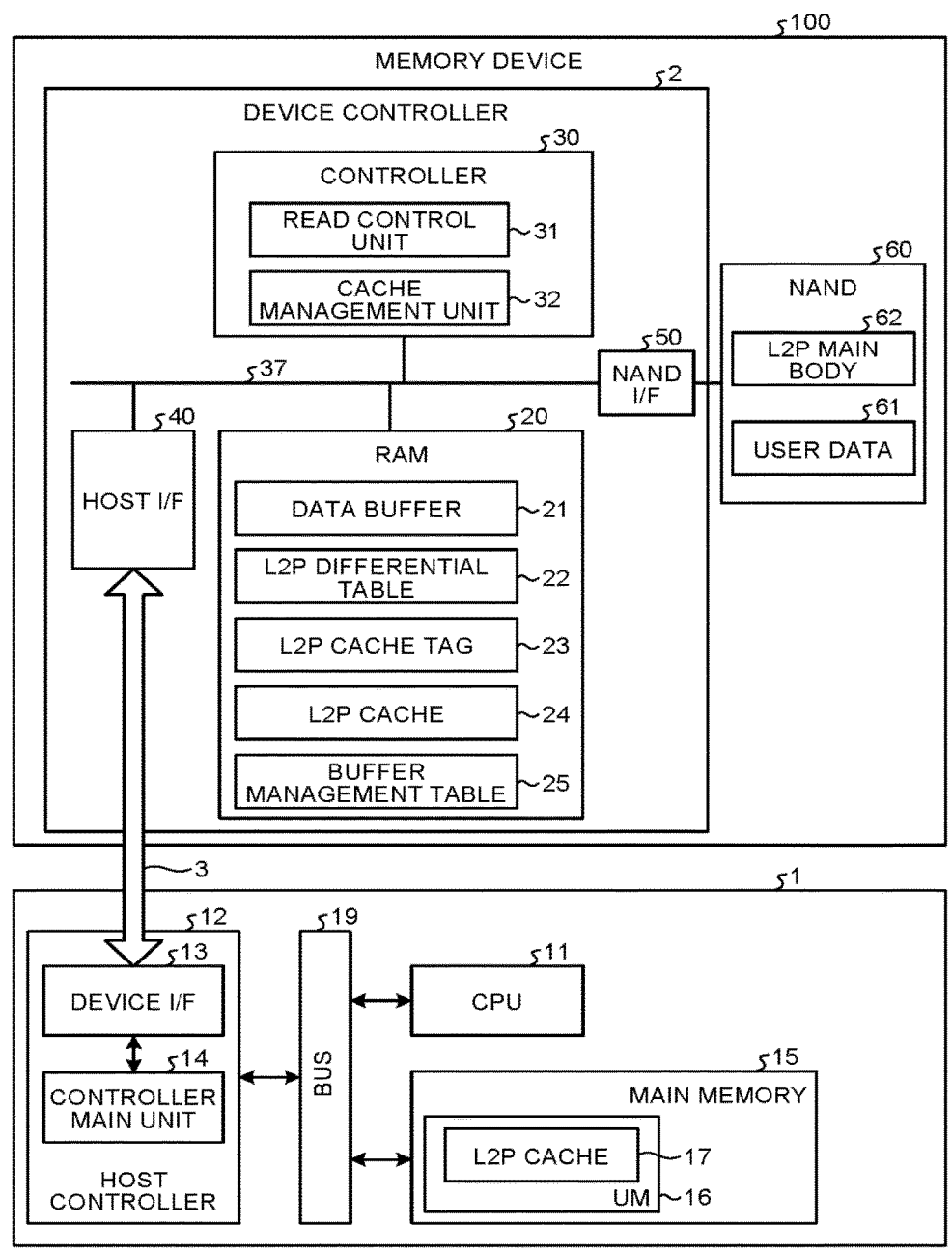
FIG. 1 is a diagram that illustrates an example of the configuration of an information processing device according to this embodiment.

FIG. 1 illustrates an example of the configuration of an information processing device according to this embodiment. The information processing device includes a host device (hereinafter, abbreviated as a host) 1 and a memory device 100. The memory device 100 functions as an external storage device of the host 1. The host 1 and the memory device 100 are compliant with a Universal Flash Storage (UFS) standard or a Non-Volatile Memory Express (NVMe) standard and support a function corresponding to Unified Memory Architecture (UMA).

The host 1 and the memory device 100 are connected through a communication line 3. As the memory device 100, an embedded-type flash memory, a solid state drive (SSD), or the like may be used. For example, the host 1 is a personal computer, a mobile phone, an imaging apparatus, or the like.

The memory device 100 includes: a NAND flash memory (hereinafter, abbreviated as a NAND) 60 as a nonvolatile memory and a device controller 2 that transmits/receives data to/from the host 1. The nonvolatile memory is not limited to the NAND flash memory but may be a flash memory having a three-dimensional structure, a resistance random access memory (ReRAM), a ferroelectric random access memory (FeRAM), or the like.

The NAND 60 includes one or more memory chips each including a memory cell array. The memory cell array includes a plurality of memory cells arranged in a matrix pattern. The memory cell array includes a plurality of blocks that are units for data erasing. Each block is configured by a plurality of pages. A page is a minimal unit for reading or writing data.

In the NAND 60, user data 61 transmitted from the host 1, management information of the memory device 100, firmware (not illustrated in the diagram), and the like are stored. The management information includes a logical/physical translation table 62 (L2P main body table), a block management table (not illustrated in the drawing), and the like. In the L2P main body table 62, mapping representing a correspondence relation between a logical address used by the host 1 and a physical address of the NAND 60 is registered. As the logical address, for example, a logical block addressing (LBA) is used. The physical address represents a storage position (block address+page address+a storage position within the page) on the NAND 60 in which data is stored. The block management table, for example, manages the following information.

Erase count of each block

Use state (information representing either an active block or a free block)

Information representing the physical location of a bad block

An active block is a block in which valid data is recorded. A free block is a block in which valid data has not been recorded and is reusable after erasing the data. A bad block is an unusable block that does not normally operate due to various factors.

The device controller 2 includes: a RAM 20; a controller 30; a host interface (host I/F) 40; a NAND interface (NAND I/F) 50; and a bus 37 connecting such internal components.

The host I/F 40 is a connection interface for the communication line 3. The host I/F 40 functions as a host communication unit communicating with the host. An arbitrary communication interface standard such as Non-Volatile Memory Express (NVMe), Universal Flash Storage (UFS), or PCI Express (PCIe) may be employed by the host I/F 40. The NAND I/F 50 is a connection interface for the NAND 60. The NAND I/F 50 directly controls data writing, data reading, data erasing of the NAND 60 under the control of the controller 30.

The RAM 20 is a volatile semiconductor memory that can be accessed at a higher speed than the NAND 60. As the RAM 20, a static random access memory (SRAM) or a dynamic random access memory (DRAM) is used. The RAM 20 temporarily stores firmware stored in the NAND 60.

The RAM 20 includes a data buffer 21. The user data received from the host 1 is temporarily stored in the data buffer 21 before the user data is written into the NAND 60. The user data read from the NAND 60 is temporarily stored in the data buffer 21 before the user data is transmitted to the host 1.

The RAM 20 temporarily stores the user data and the management information used for managing the memory device 100. The management information is read from the NAND 60 and is loaded into the RAM 20. The management information loaded into the RAM 20 is backed up by the NAND 60. FIG. 1 illustrates only information relating to L2P information as the management information managed by the RAM 20. Information relating to an L2P table includes an L2P differential table 22, an L2P cache tag 23, an L2P cache 24, and a buffer management table 25.

In the L2P differential table 22, L2P information relating to data that has recently been written into the NAND 60 is stored. For example, the L2P differential table 22 has a certain volume and stores the L2P information relating to data that has recently been written up to a certain volume. The L2P information of the L2P differential table 22 is stored in the L2P main body table 62 of the NAND 60 when a certain condition is satisfied. Here, time when a certain condition is satisfied, for example, is time when the L2P differential table 22 is filled with the L2P information, time of the power-off sequence, or the like.

In the L2P cache 24, a part of the L2P main body table 62 is cached. As will be described later, in a case where the UM 16 of the main memory 15 of the host 1 is unusable or when the size of the UM 16 is less than a certain threshold, the L2P cache 24 is secured in the RAM 20. In other words, in this embodiment, in a case where the UM 16 of the host 1 is usable, and the size of the UM 16 can be secured to be a certain threshold or more, the L2P cache 24 is not secured, but an L2P cache 17 is secured in the UM 16. In the L2P cache 24, the physical address of the L2P information is cached.

In the L2P cache tag 23, tag information used for determining hit/miss of the L2P cache 24 of the RAM 20 or the L2P cache 17 of the UM 16 is stored. The tag information includes the logical address of the L2P information.

In the buffer management table 25, L2P information (information representing a correspondence relation between a logical address used by the host 1 and a physical address of the data buffer 21) of data that is temporarily stored in the data buffer 21 is managed. By referring to the buffer management table 25, it can be checked whether or not data is present in the data buffer 21.

Next, the configuration of the host 1 will be described. The host 1 includes: an operation system (OS); a CPU 11 executing a user program; a host controller 12; and a main memory 15. The CPU 11, the main memory 15, and the host controller 12 are interconnected through a bus 19.

The main memory 15, for example, is configured by a DRAM. The main memory 15, in addition to an area used by the host 1, includes a device use area (hereinafter, referred to as unified memory: abbreviated as UM) 16 that is be allocated to various devices connected to the host 1. As one of various devices connected to the host 1, there is the memory device 100. The UM 16 is used as the L2P cache 17 of the memory device 100. In the L2P cache 17, the physical address of the L2P information is cached.

The host controller 12 includes: a device I/F 13 that is a connection interface of the communication line 3; and a controller main unit 14. The controller main unit 14 transmits/receives data and a command to/from the main memory 15 and the CPU 11 through the bus 19. In addition, the controller main unit 14 transmits/receives data (including a command) to/from the memory device 100 through the device I/F 13.

Next, the controller 30 of the memory device 100 will be described. The controller 30 of the memory device 100 controls the memory device 100. In addition, the controller 30 controls an operation of reading data that is cached in the L2P cache 17 inside the UM 16. The function of the controller 30 is realized by a CPU and a plurality of peripheral circuits. The function of the CPU is realized by executing firmware loaded into the RAM 20. The controller 30 includes a read control unit 31, a cache management unit 32, and the like. While not illustrated in the drawing, the controller 30 includes a function control unit in addition to the read control unit 31 and the cache management unit 32.

In a case where a command is received from the host 1 through the host I/F 40, the controller 30 executes a control process according to the command. For example, in a case where a write command is received from the host 1, the controller 30 transmits data between the main memory 15 of the host 1 and the data buffer 21 of the RAM 20. The controller 30 writes write data transmitted to the RAM 20 into the NAND 60 by controlling the NAND I/F 50. In accordance with this writing operation, the controller 30 updates management information managed by the RAM 20.

In a case where a read command is received from the host 1, the read control unit 31 searches the buffer management table 25, the L2P differential table 22, and the L2P cache tag and searches a storage location of data corresponding to a logical address specified by the read command by controlling the cache management unit 32. The read control unit 31 acquires data specified by the read command based on the storage position acquired through the search and transmits the acquired data to the host 1.

The cache management unit 32 manages and searches caches (the L2P cache tag 23, the L2P cache 24, and the L2P cache 17). In a case where the size of the UM 16 of the host 1 is a certain threshold or more, the cache management unit 32 secures the L2P cache 17 in the UM 16. On the other hand, in a case where the size of the UM 16 of the host 1 is less than the certain threshold, the cache management unit 32 secures the L2P cache 24 in the RAM 20. The cache management unit 32 sets the cache line size of the L2P cache 17 to be larger than the cache line size of the L2P cache 24.

In addition to the read/write control for the NAND 60 and the update control of the management information, the controller 30 executes control of an error correction process, control of an encryption process, garbage collection control, wear leveling control, control of movement of the management information managed by the RAM 20 to the NAND 60 to be nonvolatile, and the like.

Figure 2:
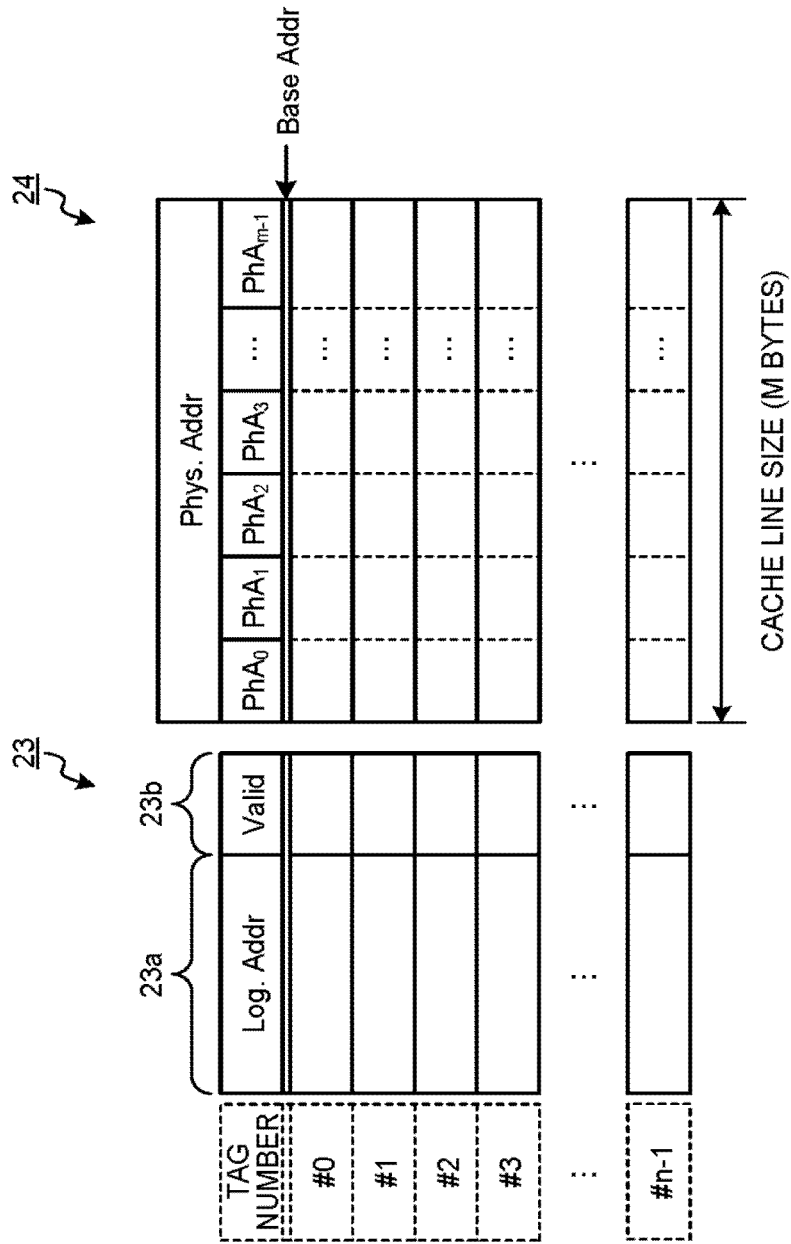
FIG. 2A is a diagram that illustrates the memory structure of an L2P cache tag.
FIG. 2B is a diagram that illustrates the memory structure of an L2P cache arranged in a memory device.

FIG. 2A is a diagram that illustrates the structure of the L2P cache tag 23 inside the RAM 20 in a case where the L2P cache 24 is secured in the RAM 20. FIG. 2B is a diagram that illustrates the structure of the L2P cache 24 inside the RAM 20. As illustrated in FIG. 2B, the L2P cache 24 includes n entries (cache lines). In each cache line configuring the L2P cache 24, a plurality of (m) physical addresses (PhA0, PhA1, . . . , PhAm−1) are stored. The cache line size of the L2P cache 24 is M bytes. In units of cache lines, m physical addresses (PhA0, PhA1, . . . , PhAm−1) included in the cache line are updated. Base Addr is the address of the base of the L2P cache 24. Here, it may be set such that m=1.

As illustrated in FIG. 2A, the L2P cache tag 23 includes n tag areas (entries) corresponding to n cache lines configuring the L2P cache 24. The n entries of the L2P cache tag 23 have one-to-one correspondence with the n entries of the L2P cache 24. Each entry includes: a field 23a in which the tag is stored; and a field 23b in which a valid (VL) bit representing whether or not the cache line is valid is stored. Each entry is managed by using a tag number as an index.

In the field 23a, all the bits of the LBA (Log. Addr) corresponding to one of m physical addresses PhA0, PhA1, . . . , PhAm−1 stored in a corresponding cache line of the L2P cache are stored. For example, in the field 23a, a LBA corresponding to the physical address PhA1 is stored. The valid bit stored in the field 23b represents whether or not all the physical addresses PhA0, PhA1, . . . , PhAm−1 stored in a cache line corresponding to the tag are valid.

Figure 3:
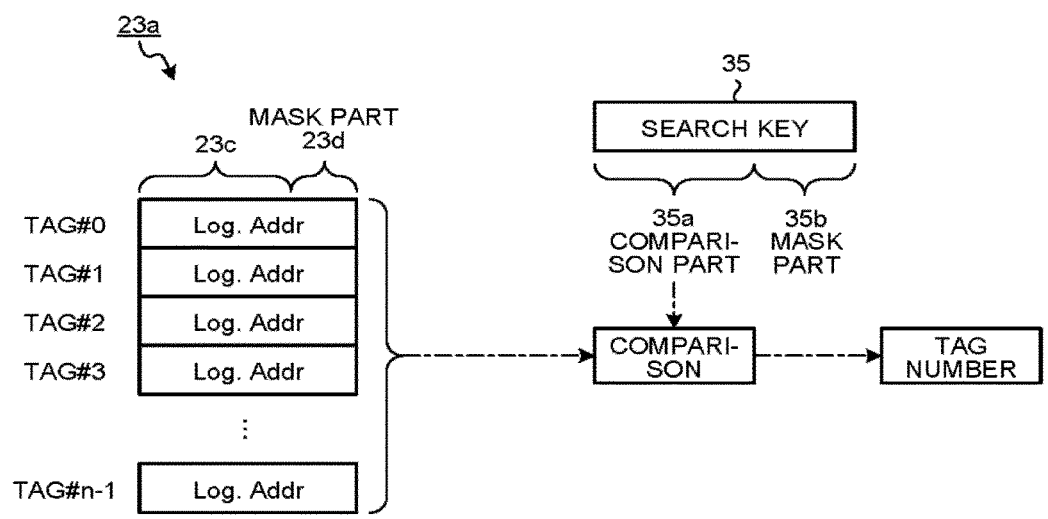
FIG. 3 is a diagram that conceptually illustrates a method for searching an L2P cache tag.

FIG. 3 is a diagram that schematically illustrates an example of a search process for the cache tag 23. An LBA included in a read command received from the host 1 is used as a search key 35. At the time of performing a search, the cache management unit 32 masks a part 35b of the search key, masks a part 23d of the tag (Log. Addr), and compares the remaining part 35a of the search key that has not been masked with the remaining part 23c of the tag (Log. Addr) that has not been masked. In a case where m=64, and 64 physical addresses are stored in one cache line, low-order six bits of the search key and the tag information are masked, and the remaining bit parts of the search key and the tag are set as comparison targets. In a case where a tag hitting the search key is present inside n tags included in the L2P cache tag 23, the cache management unit 32 notifies the read control unit 31 of a tag number corresponding to the hit tag. The read control unit 31 reads a physical address corresponding to an LBA included in the search key 35 from a cache line corresponding to the tag number inside the L2P cache 24 based on the notified tag number. In the case illustrated in FIG. 3, while a full associative system is employed, and the comparison part 35a of the search key is compared with all the bits of the remaining part 23c of the tag, a direct mapping type or an N-way set associative system may be employed. In such a case, some bits included in the comparison part 35a of the search key are used, one or x (here, x<n) comparison target tags are selected from among n tags, and the selected one or x comparison target tags are compared with a part of the comparison part 35a of the search key that is acquired by excluding the some bits described above, whereby a hit/miss of the cache is determined.

The storage position of a cache line corresponding to a tag number on the L2P cache 24 can be acquired based on Equation (1).

cache line size (M bytes)×tag number+base address (Base Addr)    (1)

The read control unit 31 can acquire one physical address among m physical addresses included in one cache line based on bits (low-order several bits inside the LBA) of the mask part 35b inside the search key 35.

Figure 4:
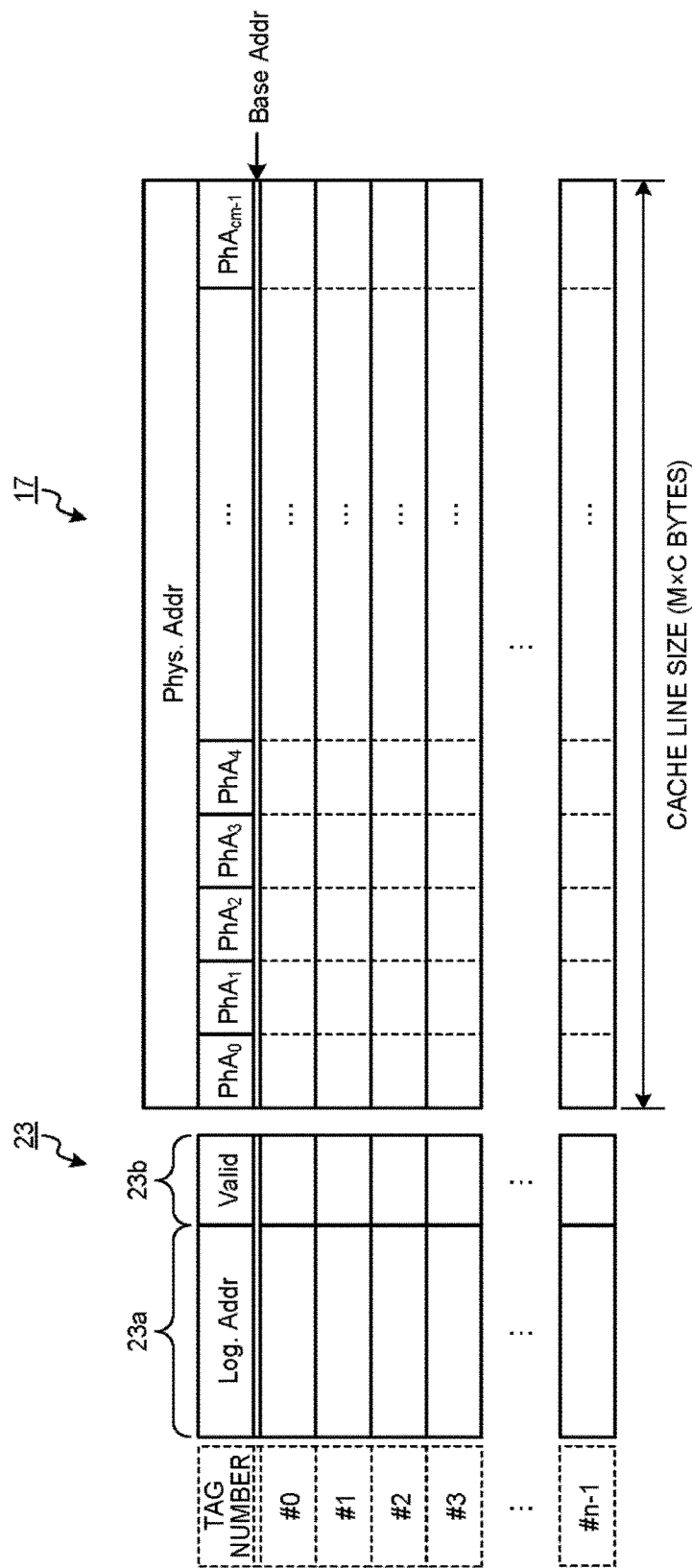
FIG. 4A is a diagram that illustrates the memory structure of an L2P cache tag.
FIG. 4B is a diagram that illustrates the memory structure of an L2P cache arranged in UM.

FIG. 4A is a diagram that illustrates the structure of the L2P cache tag 23 arranged inside the RAM 20 of a case where the L2P cache 17 is secured in the UM 16. FIG. 4B is a diagram that illustrates the structure of the L2P cache 17 arranged inside the UM 16. The L2P cache 17, similar to the L2P cache 24 illustrated in FIG. 2B, includes n entries (cache lines). The cache line size of the L2P cache 17 is enlarged to be constant multiplication (C times) of that of the L2P cache 24. In other words, as illustrated in FIG. 4B, in each cache line configuring the L2P cache 17, m×C physical addresses PhA0, PhA1, . . . , PhAcm−2, PhAcm−1 are stored. Here, the cache line size of the L2P cache 24 is M×C bytes.

In a case where the L2P cache is secured in any one of the RAM 20 and the UM 16, there is no basic difference in the structure and the volume of the cache tag 23. In other words, as illustrated in FIG. 4A, the L2P cache tag 23 includes n entries managed using tag numbers #0 to #n−1 as indices. Each entry includes: a field 23a in which tag information is stored; and a field 23b in which a valid (VL) bit is stored. In the field 23a, all the bits of the LBA (Log. Addr) corresponding to one of m×C physical addresses PhA0, PhA1, . . . , PhAcm−2, PhAcm−1 stored in a corresponding cache line arranged inside the L2P cache are stored. The valid bit stored in the field 23b represents whether or not all the m×C physical addresses PhA0, PhA1, . . . , PhAcm−2, PhAcm−1 stored in a cache line corresponding to the tag are valid.

Here, generally, since a usable area of the UM 16 is larger than the cache area that can be secured inside the memory device 100, more data can be cached in the UM 16 than that of a case where data is cached inside the memory device 100. However, in a case where more data is configured to be cached by increasing the number of cache lines of the L2P cache, the volume of the tag increases according to an increase in the number of cache lines. Thus, in this embodiment, in a case where the UM 16 is used, the cache line size of the L2P cache 17 is enlarged compared to a case where the UM 16 is not used. For this reason, cache data of a more volume can be managed without changing the volume of the cache tag 23.

The search process for the cache tag 23 that is executed in a case where the L2P cache 17 is secured in the UM 16 is basically the same as that described with reference to FIG. 3. However, since the cache line size of the L2P cache 17 is enlarged, the number of bits of the mask parts 35b and 23d that are not comparison targets increases. For example, when m=64 and C=64, 64×64 physical addresses are stored in one cache line inside the L2P cache 17. In such a case, low-order 12 bits of the search key 35 and the cache tag are masked, and the remaining bit parts 35a and 23c of the search key and the cache tag are set as comparison targets. The cache management unit 32 masks the low-order 12 bits of the search key and the cache tag, sets the remaining bit parts 35a and 23c of the search key and the cache tag as comparison targets, and executes a comparison process. In a case where tag information hitting the search key is present inside n tags included in the L2P cache tag 23, the cache management unit 32 notifies the read control unit 31 of a tag number corresponding to the hit tag. The read control unit 31, as described above, reads a physical address corresponding to the LBA from a cache line corresponding to the tag number inside the L2P cache 17 based on the notified tag number.

The storage position of a cache line corresponding to a tag number on the L2P cache 17 can be acquired based on Equation (2), $$\text{cache line size (M×C bytes)×tag number+base address (Base Addr)} \quad (2)$$

The read control unit 31 can acquire one physical address among m×C physical addresses included in one cache line based on bits (low-order several bits inside the LBA) of the mask part 35*b* inside the search key 35.

Figure 5:
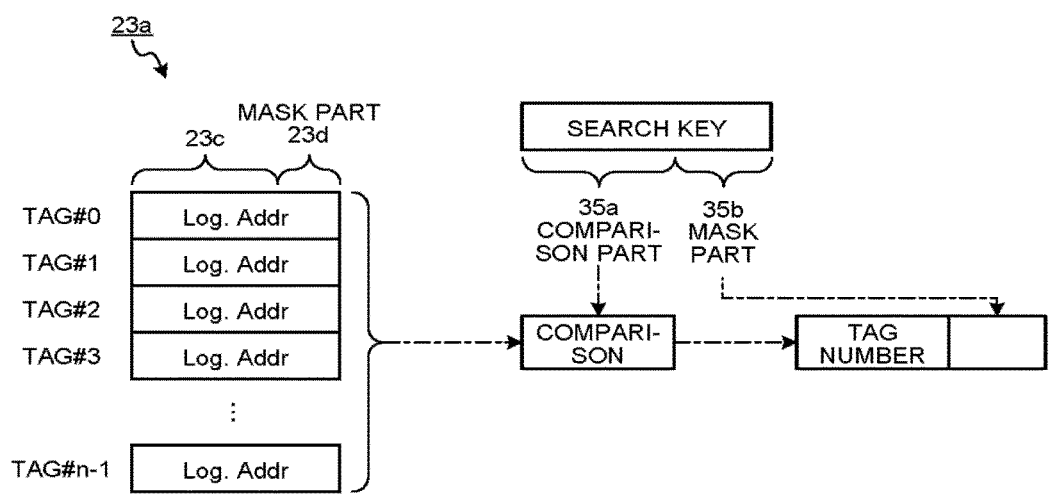
FIG. 5 is a diagram that conceptually illustrates a method for searching an L2P cache tag.

FIG. 5 illustrates a technique for adding the mask part 35*b* included in the search key 35 to the tag number. The cache management unit 32 notifies the read control unit 31 of the hit tag number and the mask part 35*b* (low-order multiple bits of the LBA that have been masked). The mask part 35*b* is configured as six bits in the case illustrated in FIGS. 2A and 2B, and is configured as 12 bits in the case illustrated in FIGS. 4A and 4B. The read control unit 31 selects one cache line from among a plurality of cache lines by using a tag number notified from the cache management unit 32 and selects one physical address from among a plurality of physical addresses included in one cache line that has been selected by using the mask part 35*b*. In the case illustrated in FIG. 5, while the full associative system is employed, and the comparison part 35*a* of the search key is compared with all the bits of the remaining part 23*c* of the tag, a direct mapping type or an N-way set associative system may be employed. In such a case, some bits included in the comparison part 35*a* of the search key are used, one or x (here, x<n) comparison target tags are selected from among n tags, and the selected one or x comparison target tags are compared with a part of the comparison part 35*a* of the search key that is acquired by excluding the some bits described above, whereby a hit/miss of the cache is determined.

Figure 6:
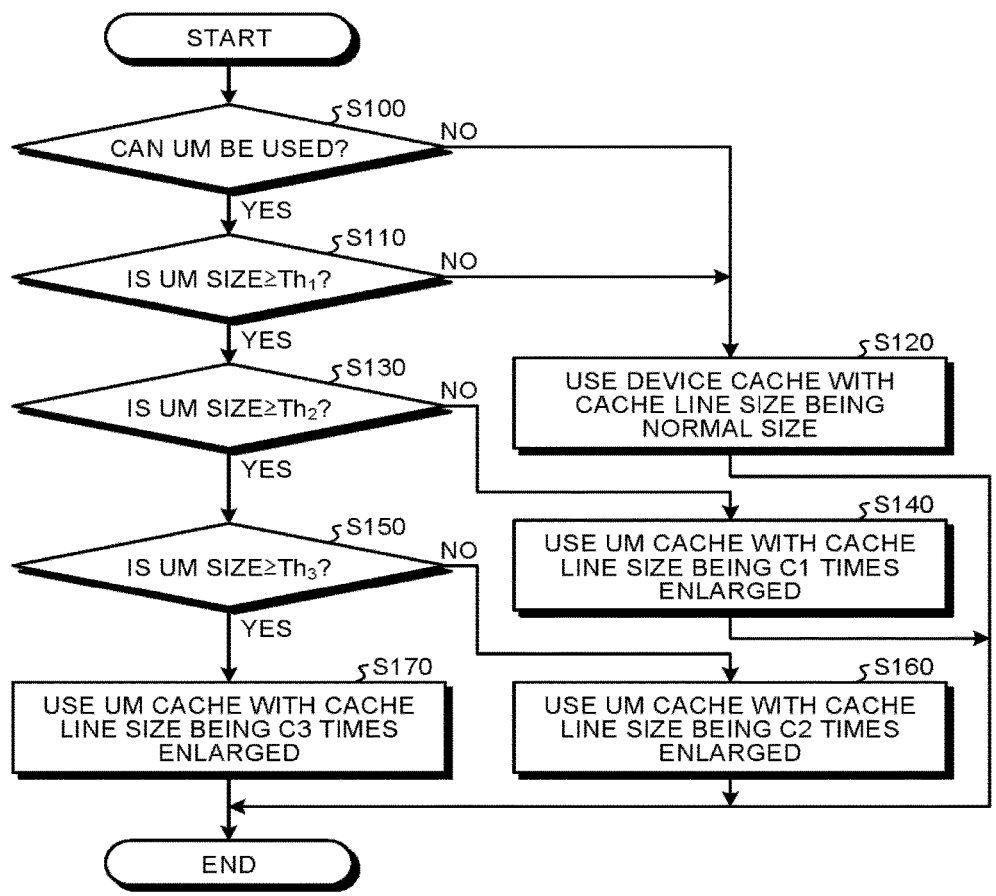
FIG. 6 is a flowchart that illustrates an initialization sequence.

FIG. 6 is a flowchart that illustrates the initialization sequence executed between the host 1 and the memory device 100 at the time of starting the operation of the memory device 100. The controller 30 determines whether or not the UM 16 can be used (Step S100). This determination may be made based on information transmitted from the host 1 at the time of starting the operation, or the host 1 may return a response according to a request from the memory device 100. In a case where a result of the determination made in Step S100 is No, the controller 30 executes the process of Step S120. On the other hand, in a case where the UM 16 can be used, the controller 30 communicates with the host 1 and determines whether or not the size of the UM 16 is a threshold Th1 or more (Step S110). In a case where the size of the UM 16 is less than the threshold Th1, the controller 30 executes the process of Step S120.

In Step S120, the controller 30 sets such that the device cache (the L2P cache 24) is used. In addition, the controller 30, as illustrated in FIG. 2B, selects a normal size (M bytes) as the cache line size of the L2P cache.

In a case where the UM size is the threshold Th1 or more (Step S110 Yes), the controller 30 sets such that the UM cache (the L2P cache 17) is used. In a case where Th1≤UM size<Th2 (Step S130 No), as illustrated in FIG. 4B, the controller 30 sets such that the L2P cache 17 having a cache line size that is C1 times of the normal size is used (Step S140).

In a case where Th2≤UM size<Th3 (Step S150 No), the controller 30 sets such that the L2P cache 17 having a cache line size that is C2 times of the normal size is used (Step S160). Here, C1<C2.

In a case where Th3≤UM size (Step S150 Yes), the controller 30 sets such that the L2P cache 17 having a cache line size that is C3 times of the normal size is used (Step S170). Here, C2<C3.

In the case illustrated in FIG. 6, while three thresholds are prepared, and the cache line size is configured to be expandable to mutually-different three sizes, the cache line size may be configured to be expandable to an arbitrary number (one or more) of mutually-different sizes. It is preferable that the thresholds Th1 to Th3 are determined based on "normal cache line size×number (n) of cache lines×constant".

Figure 7:
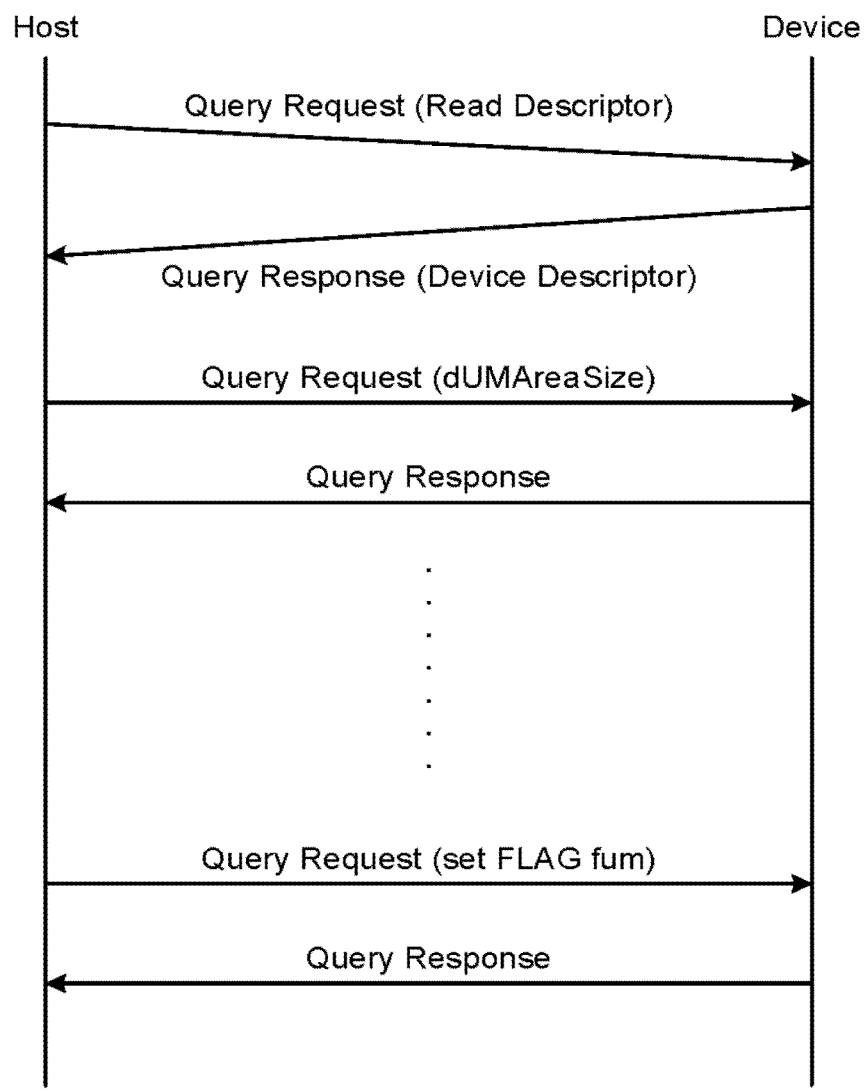
FIG. 7 is a diagram that illustrates an initialization sequence of UM.

FIG. 7 is a diagram that illustrates an initialization sequence of UM that is defined in the UM extended standard of UFS. Along this initialization sequence, a query sequence between the host 1 and the memory device 100 will be described. The host 1 transmits a Query Request including a query relating to a minimal size (dMinUMAreaSize) of the UM area that is required by a device to the device. When this Query Request is received, the memory device 100, for example, transmits a Query Response including the threshold Th1 of the lower limit illustrated with reference to FIG. 6 to the host 1. When this Query Response is received, the host 1 determines the base address and the size of a UM area and transmits a Query Request including dUMAreaSize in which the base address and the size of the UM area are designated to the device.

The memory device 100 determines one of the L2P cache 24 and the L2P cache 17 to be used by executing the process illustrated in FIG. 6 based on the UM size included in dUMAreaSize and selects the cache line size of the L2P cache 17. Thereafter, the memory device 100 transmits a Query Response to the host 1. Thereafter, the memory device 100 performs communication relating to the other UM settings. Then, the host 1 transmits a Query Request including fum flag=1 to the device, thereby notifying the device that the UM process is enabled. When this Query Request is received, the memory device 100 executes the initial setting of the UM process, resets the fum flag, and transmits a Query Response including the reset fum flag to the host 1.

Figure 8:
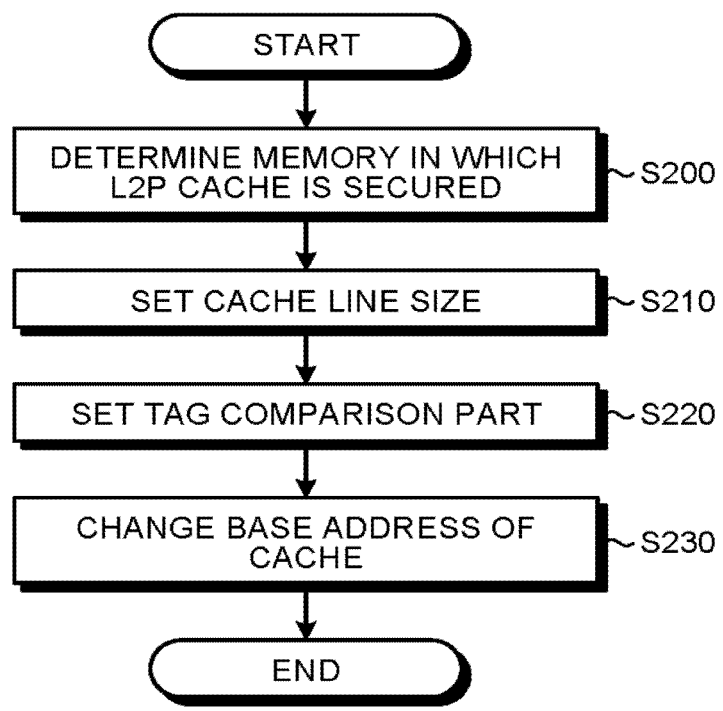
FIG. 8 is a flowchart that illustrates the setting sequence of a cache management process.

FIG. 8 is a flowchart that illustrates the setting sequence of a cache management process executed after the initialization sequence illustrated in FIG. 6. When the initialization sequence illustrated in FIG. 6 ends, the controller 30 executes the following setting process for the cache management unit 32. It is determined whether to secure the L2P cache in either the RAM 20 or the UM 16 (S200). Next, the cache line size of the L2P cache is set (Step S210). When the cache line size is set, any one of the cache line size and the magnification may be used. Next, the bit positions of the comparison parts 35*a* and 23*c* used in the search process are set (Step S220). In other words, based on the set cache line size, bits of the LBA that form a comparison target are set. In addition, in a case where the UM 16 is not used, an address of the RAM 20 that is set in advance is set as a base address of the L2P cache 24. On the other hand, in a case where the L2P cache 17 of the UM 16 is used, the base address notified from the host 1 is set as the base address of the L2P cache 17 (Step S230).

Figure 9:
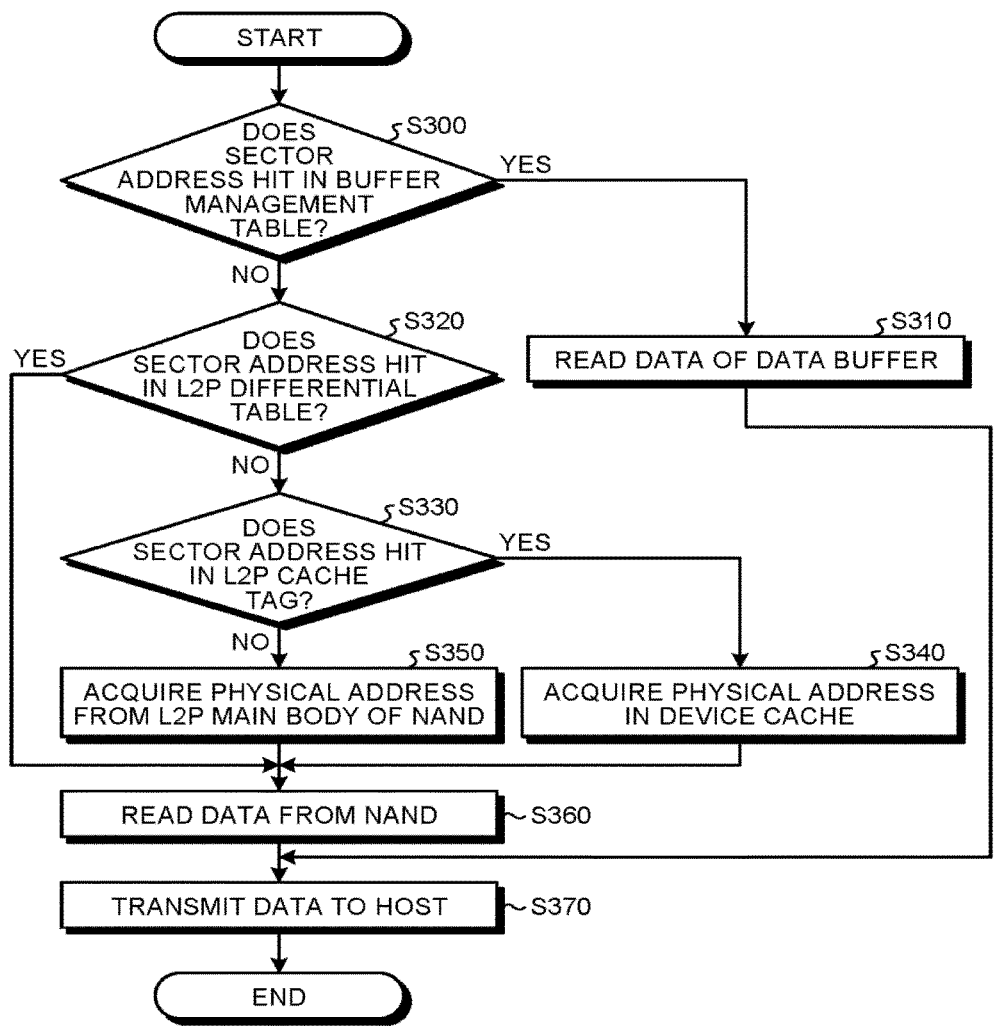
FIG. 9 is a flowchart that illustrates the sequence of a reading process of a case where UM is not used.

FIG. 9 is a flowchart that illustrates the sequence of an address resolution process when a read command is received in a case where the UM 16 is not used. When a read command is received from the host 1, the read control unit 31 calculates the range of LBA requested for reading based on the logical address (LBA) and the data size included in the received read command. The read control unit 31 decomposes the LBA range that is a reading target into parts of a sector size and executes the following process for each decomposed part of the sector size. The sector size, for example, is 4 KiB or 512 B.

First, the read control unit 31 determines whether or not the sector address that is a reading target hits in the buffer management table 25 (Step S300). In the case of a hit in the buffer management table 25, the read control unit 31 reads data of the data buffer 21 (Step S310) and transmits the read data to the host 1 (Step S370). Alternatively, the read control unit 31 may read data stored in the data buffer 21, store the read data in the NAND 60 so as to enable the data to be nonvolatile, read data from the NAND 60, and transmit the data to the host 1.

In a case where a result of the determination made in Step S300 is No, the read control unit 31 determines whether or not the sector address that is a reading target hits in the L2P differential table 22 (Step S320). In the L2P differential table 22, as described above, the L2P information relating to data that has recently been written into the NAND 60 is recorded. In the case of a hit in the L2P differential table 22, the read control unit 31 reads data from the NAND 60 based on the L2P differential table 22 (Step S360) and transmits the read data to the host 1 (Step S370).

In a case where a result of the determination made in Step S320 is No, the read control unit 31 notifies the cache management unit 32 of a sector address that is the reading target. The cache management unit 32 determines whether or not the sector address that is the reading target hits in the L2P cache tag 23 (Step S330). In this determination process, the cache management unit 32, as described above, masks the low-order multiple bits 35b (low-order six bits in case of m=64) of the sector address that is the reading target, masks the low-order multiple bits 23d (low-order six bits in case of m=64) of the tag of the L2P cache tag 23, and compares the high-order multiple bits 35a of the sector address that is the reading target with the high-order multiple bits 23c of the tag of the L2P cache tag 23. In a case where the sector address that is the reading target hits in the L2P cache tag 23, the cache management unit 32 notifies the read control unit 31 of the hit tag number. The read control unit 31 calculates the position of a cache line corresponding to the tag number based on the notified tag number and Equation (1) described above and acquires a physical address from the cache line corresponding to the tag number inside the L2P cache 24 on the RAM 20 (Step S340). At this time, one physical address corresponding to the sector address that is the reading target may be acquired from the cache line, a part of a plurality of physical addresses included in the cache line may be acquired, or all the physical addresses included in the cache line may be acquired. The read control unit 31 reads data from the NAND 60 based on the acquired physical address (Step S360) and transmits the read data to the host 1 (Step S370).

In a case where the sector address that is the reading target does not hit in the L2P cache tag 23 (Step S330 No), the cache management unit 32 notifies the read control unit 31 of no hit. The read control unit 31 reads the L2P information including the sector address that is the reading target from the L2P main body table 62 of the NAND 60 and acquires a physical address corresponding to the sector address that is the reading target by using the read L2P information (Step S350). The read control unit 31 reads data from the NAND 60 based on the acquired physical address (Step S360) and transmits the read data to the host 1 (Step S370). A part of the L2P main body table read from the NAND 60 is temporarily buffered in the RAM 20, and thereafter, at an appropriate time point, the LBA is registered in the L2P cache tag 23, and the physical address is registered in the L2P cache 24.

Figure 10:
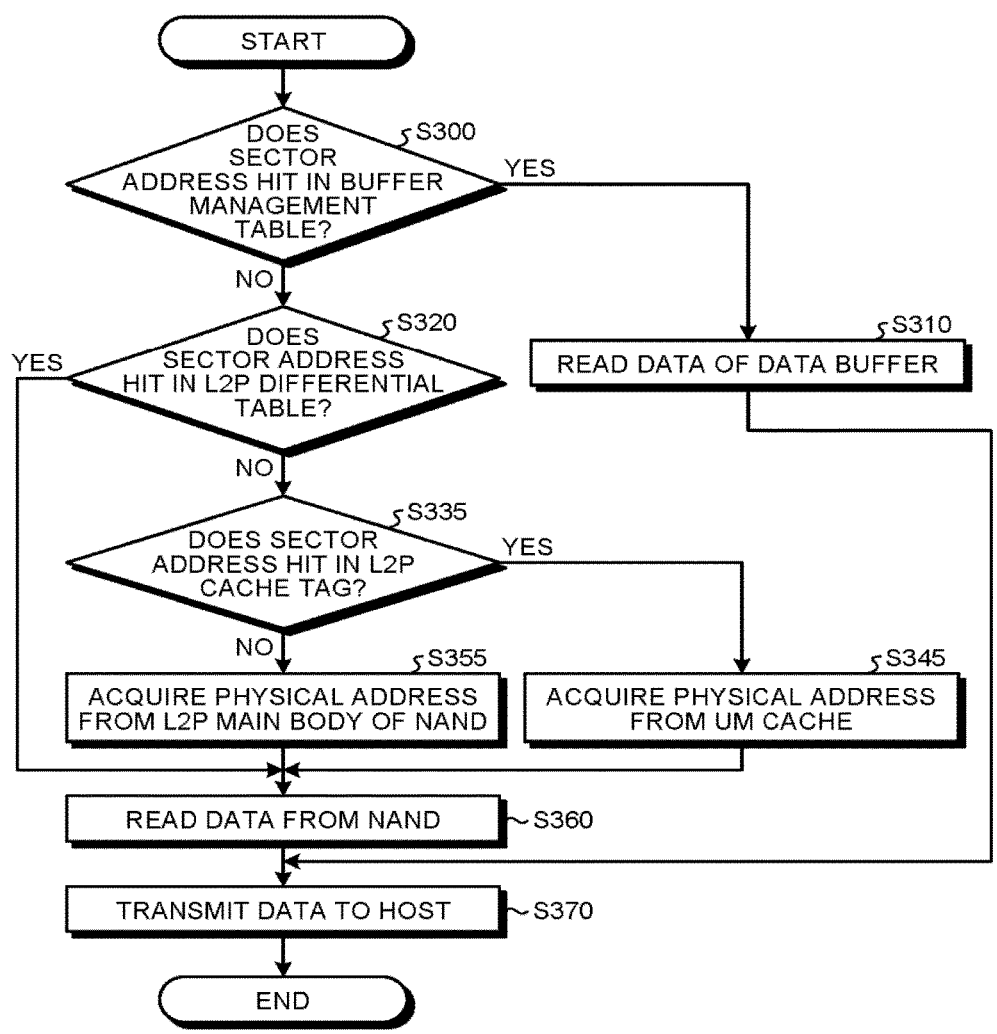
FIG. 10 is a flowchart that illustrates the sequence of a reading process of a case where UM is used.

FIG. 10 is a flowchart that illustrates the sequence of an address resolution process that is executed when a read command is received in a case where the UM 16 can be used. The sequence of Steps S300 to S320 is similar to that illustrated in FIG. 9, and thus, duplicate description will not be presented. In a case where a result of the determination made in Step S320 is No, the read control unit 31 notifies the cache management unit 32 of a sector address that is the reading target. The cache management unit 32 determines whether or not the sector address that is the reading target hits in the L2P cache tag 23 (Step S335). In this determination process, the cache management unit 32, as described above, masks the low-order multiple bits 35b (low-order 12 bits in case of m=64 and C=64) of the sector address that is the reading target, masks the low-order multiple bits 23d (low-order 12 bits in case of m=64 and C=64) of the tag of the L2P cache tag 23, and compares the high-order multiple bits 35a of the sector address that is the reading target with the high-order multiple bits 23c of the tag of the L2P cache tag 23. In a case where the sector address that is the reading target hits in the L2P cache tag 23, the cache management unit 32 notifies the read control unit 31 of the hit tag number. The read control unit 31 calculates the position of a cache line on the UM 16 that corresponds to the tag number based on the notified tag number, the base address of the UM 16, and Equation (2) described above.

The controller 30 generates a command (Access UM Buffer) used for fetching (reading) data from the UM 16. In this command (Access UM Buffer), a read command, a read address (the position of a cache line on the UM 16 that corresponds to the tag number) calculated by the read control unit 31, a data size, and the like area included. The controller 30 transmits this command (Access UM Buffer) to the host controller 12 through the host I/F 40. When the command (Access UM Buffer) is received from the memory device 100, the host controller 12 fetches data (physical address) included in the cache line from the UM 16 of the main memory 15 based on the command. The host controller 12 transmits the fetched physical address to the memory device 100 (UM DATA OUT). The memory device 100 receives the physical address transmitted from the host controller 12. The host I/F 40 transmits the received physical address to the RAM 20 (Step S345). The read control unit 31 reads data from the NAND 60 based on the physical address transmitted to the RAM 20 (Step S360) and transmits the read data to the host 1 (Step S370). When a physical address included in the cache line is acquired from the UM 16, one physical address corresponding to the sector address that is the reading target may be acquired from the cache line, a part of a plurality of physical addresses included in the cache line may be acquired, or all the physical addresses included in the cache line may be acquired.

In a case where the sector address that is the reading target does not hit in the L2P cache tag 23 (Step S335 No), the cache management unit 32 notifies the read control unit 31 of no hit. The read control unit 31 reads the L2P information including the sector address that is the reading target from the L2P main body table 62 of the NAND 60 and acquires a physical address corresponding to the sector address that is the reading target by using the read L2P information (Step S355). The read control unit 31 reads data from the NAND 60 based on the acquired physical address (Step S360) and transmits the read data to the host 1 (Step S370). A part of the L2P main body table read from the NAND 60 is temporarily buffered in the RAM 20, and thereafter, at an appropriate time point, the LBA is registered in the L2P cache tag 23, and the physical address is registered in the L2P cache 17 of the UM 16.

In this way, according to this embodiment, in a case where the UM 16 is used, compared to a case where the UM 16 is not used, the cache line size of the L2P cache is enlarged. For this reason, cache data of a large volume can be managed using a tag of a small volume. In a case where cache data of a large volume is stored by increasing the number of cache lines, the volume of the tag increases according to an increase in the number of cache lines.

When a hit occurs in the cache of the UM 16, a necessary one entry (one cache line) may be read, or data (physical address) of a plurality of entries (a plurality of cache lines) on the periphery (close tag number) of the necessary entry may be read together. In a sequential reading process, continuous entries are read, and accordingly, in a case where a plurality of entries are read together, an address resolution process having high efficiency can be executed.

As illustrated in FIG. 6, while the size of the cache line of the L2P cache is configured to be changed according to the size of the UM 16, the number of entries (the number of cache lines) to be read together may be changed according to the size of the cache line of the L2P cache secured in the UM 16.

In a case where the UM is used, the L2P cache may be secured in both the RAM 20 and the UM 16. For example, it may be configured such that the L2P cache 24 secured in the RAM 20 is used as a primary cache, and the L2P cache 17 secured in the UM 16 is used as a secondary cache. In such a case, inside the memory device 100, a cache tag used for the L2P cache 24 and a cache tag used for the L2P cache 17 need to be separately secured. In addition, the L2P cache tag 23 may be secured in the UM 16.

In the embodiment described above, while the L2P is cached in the UM 16, the caching target of the UM 16 is not limited to the L2P. For example, write data may be cached in the UM 16, and a reverse lookup table used for searching a logical address using a physical address may be cached in the UM 16.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device connectable to a host including a first memory, the memory device comprising:
   a second memory that is nonvolatile;
   a third memory that is volatile; and
   a controller configured to:
   in a case where the first memory is not used, cache a part of first information stored in the second memory into the third memory with a first cache line size, and cache a first number of pieces of first data into respective cache lines configuring second information, the second information being the part of the first information cached in the third memory; and
   in a case where the first memory is used, cache a part of the first information into the first memory with a second cache line size, and cache a second number of pieces of first data into respective cache lines configuring third information, the second number being a value acquired by first constant times of the first number, the third information being the part of the first information cached in the first memory, the second cache line size being larger than the first cache line size.

2. The memory device according to claim 1, wherein the controller sets the second cache line size to become larger accordingly as a size of the first memory becomes larger.

3. The memory device according to claim 1, wherein the controller is configured to:
   in a case where the first memory is not used, store, in the third memory, fourth information that is a cache tag of second information; and
   cache tag information that corresponds to one piece of the first data among the first number of pieces of the first data into respective tag area configuring the fourth information.

4. The memory device according to claim 3, wherein the controller is configured to:
   in a case where the first memory is used, store, in the third memory, fifth information that is a cache tag of the third information; and
   cache tag information that corresponds to one piece of the first data among the second number of pieces of the first data into respective tag area configuring the fifth information.

5. The memory device according to claim 4, wherein the controller sets the first constant to a different value in accordance with a size of the first memory.

6. The memory device according to claim 4, wherein the controller is configured to:
   in a case where the first memory is not used, set some bits excluding bits corresponding to the number of bits corresponding to the first number from a plurality of bits configuring the tag information as a search target; and
   in a case where the first memory is used, set some bits excluding bits corresponding to the number of bits corresponding to the second number from the plurality of bits configuring the tag information as a search target.

7. The memory device according to claim 4, wherein,
   the first information includes an association of a logical address specified by the host with a physical address of the second memory,
   the second information includes the physical address,
   the third information includes the physical address,
   the fourth information includes the logical address, and
   the fifth information includes the logical address.

8. The memory device according to claim 7, wherein the controller is configured to:
   cache a first number of the physical addresses into respective cache lines configuring the second information;
   cache a logical address that corresponds to one physical address among the first number of the physical addresses into respective tag areas configuring the fourth information as tag information;

cache a second number of the physical addresses into respective cache lines configuring the third information, the second number being a value acquired by first constant times of the first number; and cache a logical address that corresponds to one physical address among the second number of the physical addresses into respective tag areas configuring the fifth information as tag information.

9. The memory device according to claim 8, wherein, in a case where the first memory is not used, and when the read command is received from the host, the controller excludes low-order bits having the number of bits corresponding to the first number from a first logical address included in a read command and the tag information and compares the first logical address from which the low-order bits are excluded with the tag information from which the low-order bits are excluded, and in a case where the first memory is used, and when the read command is received from the host, the controller excludes low-order bits having the number of bits corresponding to the second number from the first logical address included in a read command and the tag information and compares the first logical address from which the low-order bits are excluded with the tag information from which the low-order bits are excluded.

10. The memory device according to claim 9, wherein the controller, in a case where the first memory is used, is configured to:

in a case where the tag information matching the first logical address is present inside the fifth information as a result of the comparison, acquire a physical address corresponding to the first logical address from a cache line included in the third information corresponding to matching tag information; and in a case where the tag information matching the first logical address is not present inside the fifth information, acquire a physical address corresponding to the first logical address from the first information stored in the second memory.

11. An information processing device comprising:

a host that includes a first memory; and a memory device that is connectable to the host, the memory device including:

a second memory that is nonvolatile;

a third memory that is volatile; and a controller configured to:

in a case where the first memory is not used, cache a part of first information stored in the second memory into the third memory with a first cache line size and cache a first number of pieces of first data into respective cache lines configuring second information, the second information being the part of the first information cached in the third memory; and in a case where the first memory is used, cache a part of the first information into the first memory with a second cache line size, and cache a second number of pieces of first data into respective cache lines configuring third information, the second number being a value acquired by first constant times of the first number, the third information being the part of the first information cached in the first memory, the second cache line size being larger than the first cache line size.

12. The information processing device according to claim 11, wherein the controller sets the second cache line size to become larger accordingly as a size of the first memory becomes larger.

13. The information processing device according to claim 11, wherein the controller is configured to:

in a case where the first memory is not used, store, in the third memory, third information that is a cache tag of second information; and cache tag information that corresponds to one piece of the first data among the first number of pieces of the first data into respective tag area configuring the fourth information.

14. The information processing device according to claim 13, wherein the controller is configured to:

in a case where the first memory is used, store, in the third memory, fifth information that is a cache tag of the third information; and cache tag information that corresponds to one piece of the first data among the second number of pieces of the first data into respective tag area configuring the fifth information.

15. The information processing device according to claim 14, wherein the controller sets the first constant to a different value in accordance with a size of the first memory.

16. The information processing device according to claim 14, wherein the controller is configured to:

in a case where the first memory is not used, set some bits excluding bits corresponding to the number of bits corresponding to the first number from a plurality of bits configuring the tag information as a search target; and in a case where the first memory is used, set some bits excluding bits corresponding to the number of bits corresponding to the second number from the plurality of bits configuring the tag information as a search target.

17. The information processing device according to claim 14, wherein the first information includes an association of a logical address specified by the host with a physical address of the second memory, the second information includes the physical address, the third information includes the physical address, the fourth information includes the logical address, and the fifth information includes the logical address.

18. The information processing device according to claim 17, wherein the controller is configured to:

cache a first number of the physical addresses into respective cache lines configuring the second information;

cache a logical address that corresponds to one physical address among the first number of the physical addresses into respective tag areas configuring the third fourth information as tag information;

cache a second number of the physical addresses into respective cache lines configuring the third information, the second number being a value acquired by first constant times of the first number; and cache a logical address that corresponds to one physical address among the second number of the physical addresses into respective tag areas configuring the fifth information as tag information.

19. The information processing device according to claim 18, wherein, in a case where the first memory is not used, and when the read command is received from the host, the controller excludes low-order bits having the number of bits corresponding to the first number from a first logical address included in a read command and the tag information and compares the first logical address from which the low-order bits are excluded with the tag information from which the low-order bits are excluded, and in a case where the first memory is used, and when the read command is received from the host, the controller excludes low-order bits having the number of bits corresponding to the second number from the first logical address included in a read command and the tag information and compares the first logical address from which the low-order bits are excluded with the tag information from which the low-order bits are excluded.

20. The information processing device according to claim 19, wherein the controller, in a case where the first memory is used, is configured to:

in a case where the tag information matching the first logical address is present inside the fifth information as a result of the comparison, acquire a physical address corresponding to the first logical address from a cache line included in the third information corresponding to matching tag information; and in a case where the tag information matching the first logical address is not present inside the fifth information, acquire a physical address corresponding to the first logical address from the first information stored in the second memory.

* * * * *